Jan. 13, 1959
E. STENKVIST
2,868,998
HIGH VOLTAGE POWER TRANSMISSIONS
Filed March 27, 1956
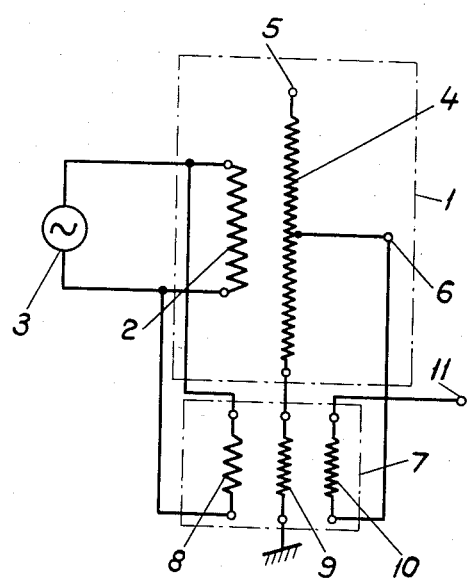
INVENTOR.
*Emil Stenkvist*
BY
*Attorney.*

United States Patent Office 2,868,998
Patented Jan. 13, 1959

2,868,998

HIGH VOLTAGE POWER TRANSMISSIONS

Emil Stenkvist, Ludvika, Sweden, assignor to Allmanna Svenska Elektriska Aktiebolaget, Vasteras, Sweden, a Swedish corporation Application March 27, 1956, Serial No. 574,217

Claims priority, application Sweden March 30, 1955

1 Claim. (Cl. 307—83)

For high voltage power transmissions, transformers having an autotransformer connected secondary winding are nowadays generally used for effecting the different necessary voltages. It can, however, occur that it is desirable to change the voltage used for the transmission on long-distance-lines and this would simply be possible by connecting in series the high voltage winding of the transformer with a secondary winding of a transformer, connected between the high voltage winding and ground, the primary winding of which is fed from the same voltage source as the main transformer. This, however, involves the disadvantages that even the other transformer derived voltages are changed. As it is not desirable, however, to change the voltage on the terminals of the transformer connected to distribution networks or other consumption objects but only to change the transmission voltage itself such an additional transformer cannot be used.

The present invention, however, relates to an arrangement by which it is possible to increase the highest voltage of a transformer with auto-connected secondary high-voltage winding without changing the other voltages obtained from the tappings of the transformer. According to the invention, this is obtained by lifting the original ground potential point of the transformers high voltage winding from ground potential by a desired amount, by connecting the secondary winding of an additional transformer in series with the auto-connected secondary winding of the main transformer, the additional transformer having one or more tertiary windings giving voltages that are subtracted from the voltages obtained at the tappings so that these are kept at their original value, the primary of the additional transformer being connected in parallel with the primary of the main transformer.

The invention will be best understood with reference to the single figure of the accompanying drawing which shows a main transformer 1 with a low-voltage winding 2, connected by way of example to a generator 3. 4 is a high voltage winding having one terminal 5 for the intended voltage of the long-distance transmission and one terminal 6 intended for connection to a local distribution network or another consumption object. 7 indicates the additional transformer provided with a primary winding 8 which is connected to the same voltage source as the primary winding 2, and a secondary winding 9 connected between the normally ground-connected terminals and ground of the high voltage winding 4, and further a tertiary winding 10, connected in series with the terminal 6 whereby both voltages in the windings 9 and 10 act in the opposite direction so that the voltage in the winding 9 is added to the voltage in the winding 4 while the voltage in the winding 10 is subtracted from the obtained voltage of the terminal 6. It is thereby possible to obtain a voltage increase at the terminal 5, without an equivalent voltage increase for the local network connected to terminal 11 or such a voltage change as is required.

I claim as my invention:

A transformer device for high tension transmitting systems, comprising a main transformer having a primary winding and a secondary winding with a tapping, means for connecting said secondary winding to a high tension transmitting line, a terminal for a local power consumption network, an additional transformer having a primary winding connected in parallel with the primary winding of the said main transformer and having a second winding in series with the said secondary winding of the main transformer on the low tension side and having a third winding which is inserted in a counteracting manner between the tapping on the secondary winding of the main transformer and the terminal for the local power consumption network.

References Cited in the file of this patent

UNITED STATES PATENTS 2,221,619   Vogel _____ Nov. 12, 1940

FOREIGN PATENTS 53,850   Holland _____ Feb. 15, 1943